United States Patent
Hayashi

(10) Patent No.: US 10,738,136 B2
(45) Date of Patent: Aug. 11, 2020

(54) METHOD OF PRODUCING POLYETHER RUBBER

(71) Applicant: ZEON CORPORATION, Tokyo (JP)

(72) Inventor: Atsushi Hayashi, Chiyoda-ku (JP)

(73) Assignee: ZEON CORPORATION, Tokyo (JP)

( * ) Notice: Subject to any disclaimer, the term of this patent is extended or adjusted under 35 U.S.C. 154(b) by 20 days.

(21) Appl. No.: 16/079,267

(22) PCT Filed: Feb. 22, 2017

(86) PCT No.: PCT/JP2017/006593
§ 371 (c)(1),
(2) Date: Aug. 23, 2018

(87) PCT Pub. No.: WO2017/150300
PCT Pub. Date: Sep. 8, 2017

(65) Prior Publication Data
US 2019/0048103 A1 Feb. 14, 2019

(30) Foreign Application Priority Data
Feb. 29, 2016 (JP) .................. 2016-037055

(51) Int. Cl.
| | |
|---|---|
| C08C 19/22 | (2006.01) |
| C08G 65/325 | (2006.01) |
| C08G 65/24 | (2006.01) |
| C08K 3/26 | (2006.01) |
| C08G 65/333 | (2006.01) |
| C08K 3/22 | (2006.01) |

(52) U.S. Cl.
CPC .............. *C08C 19/22* (2013.01); *C08G 65/24* (2013.01); *C08G 65/325* (2013.01); *C08G 65/33317* (2013.01); *C08K 3/26* (2013.01); *C08K 3/22* (2013.01); *C08K 2003/222* (2013.01); *C08K 2003/267* (2013.01); *C08K 2201/006* (2013.01)

(58) Field of Classification Search
CPC ...................................................... C08C 19/22
See application file for complete search history.

(56) References Cited

U.S. PATENT DOCUMENTS

| | | | | |
|---|---|---|---|---|
| 2007/0243984 A1* | 10/2007 | Mizumoto | ......... | G03G 15/0818 492/49 |
| 2007/0254792 A1* | 11/2007 | Mizumoto | ......... | G03G 15/0818 492/53 |
| 2008/0107456 A1* | 5/2008 | Mizumoto | ......... | G03G 15/0818 399/286 |
| 2008/0111113 A1* | 5/2008 | Mizumoto | ............. | C08J 9/0066 252/519.5 |
| 2008/0299483 A1* | 12/2008 | Mizumoto | ........... | G03G 15/752 430/130 |
| 2009/0233776 A1* | 9/2009 | Mizumoto | ......... | G03G 15/0233 492/18 |
| 2010/0143008 A1* | 6/2010 | Mizumoto | ......... | G03G 15/0233 399/286 |
| 2010/0200814 A1* | 8/2010 | Marui | ..................... | C08L 11/00 252/500 |
| 2011/0229202 A1* | 9/2011 | Mizumoto | ......... | G03G 15/0818 399/286 |
| 2012/0296049 A1* | 11/2012 | Yonemaru | ............ | C08G 65/333 525/410 |
| 2015/0073098 A1* | 3/2015 | Shinohara | .................. | C08J 3/24 525/404 |
| 2017/0029564 A1 | 2/2017 | Narita et al. | | |
| 2019/0077910 A1* | 3/2019 | Tsubata | .................. | C08G 65/24 |
| 2019/0225777 A1* | 7/2019 | Tanio | .................. | G03G 15/0818 |

FOREIGN PATENT DOCUMENTS

WO 2015/099027 A1 7/2015

OTHER PUBLICATIONS

Apr. 18, 2017 International Search Report issued in International Patent Application No. PCT/JP2017/006593.

* cited by examiner

*Primary Examiner* — Megan McCulley
(74) *Attorney, Agent, or Firm* — Oliff PLC

(57) ABSTRACT

A method of production of a polyether rubber containing unit expressed by the following general formula (1) in 0.1 mol % or more and less than 30 mol % obtained by reacting a polyether rubber containing epihalohydrin monomer unit in 0.1 mol % or more and a nitrogen atom-containing aromatic heterocyclic compound by kneading in the presence of an acid acceptor containing at least a hydrotalcite having a nitrogen adsorption specific surface area as measured by a BET method of 10 m²/g or more is provided.

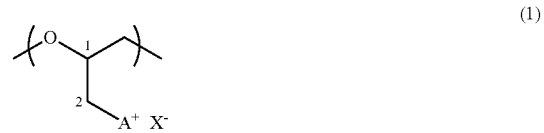

(1)

wherein, in the above general formula (1), A⁺ is a group containing a cationic nitrogen-containing aromatic heterocyclic ring, and is bonded with a carbon atom at the "2" position shown in the above general formula (1) through a nitrogen atom constituting the cationic nitrogen-containing aromatic heterocyclic ring, and X⁻ is any counter anion.

6 Claims, No Drawings

METHOD OF PRODUCING POLYETHER RUBBER

TECHNICAL FIELD

The present invention relates to a method of production of a polyether rubber, more particularly relates to a method of production of a polyether rubber having a group containing a cationic nitrogen-containing aromatic heterocyclic ring.

BACKGROUND ART

In an image-forming apparatus such as a printer, electronic photocopier, and facsimile apparatus, as the mechanism where semiconductivity is required, a conductive member such as a conductive roll, conductive blade, and conductive belt has been used.

Such a conductive member, depending on their application, are being required to provide various performances such as electroconductivity (an electrical resistance value and variation in the same, environmental dependency, and voltage dependency) within a desired range, non-contaminating ability, low hardness, and dimensional stability.

As the rubber constituting part of such a conductive member, a polyether rubber and the like which have semiconductivity in the rubber itself have been used. However, in recent years, in the image-forming apparatus, higher speed has been demanded. For the conductive member, particularly the conductive roll, further lower electrical resistance has been desired.

Further, there has been conventionally the following problem: under application of voltage to a conductive member in which a polyether rubber and the like are used, upon continuous use, the conductive member deteriorates due to electric current so that the electrical resistance value of the conductive member increases and quality of an image is impaired accordingly when the conductive member is used for the application of an image-forming apparatus. To solve this problem, for example, Patent Document 1 discloses a polyether rubber obtained by kneading using an extruder-kneader a polyether rubber containing epihalohydrin monomer unit in 0.1 mol % or more and a nitrogen atom-containing aromatic heterocyclic compound in the presence of 2.4 to 6.4 parts by weight of acid acceptors such as magnesium oxide and calcium carbonate with respect to 100 parts by weight of the polyether rubber.

However, when magnesium oxide, calcium carbonate, and the like are used as acid acceptors in such a relatively high addition ratio, the adhesion of the obtained polyether rubber to the rolls used in kneading is increased when the polyether rubber is mixed with a cross-linking agent and kneaded for cross-linking, thus posing the problem of poor processability, and the polyether rubber also has the problem in that the suppressing effect of the obtained cross-linked rubber on an increase in the electrical resistance value during continuous use is not sufficient.

PRIOR ART DOCUMENTS

Patent Documents

Patent Document 1: International Publication No. WO 2015/099027

SUMMARY OF THE INVENTION

Problem to be Solved by the Invention

An object of the present invention is to provide a method of production of a polyether rubber used for obtaining a cross-linked rubber with excellent processability, moreover, little variation in the electrical resistance value, a low electrical resistance value, and suppressed increase in the electrical resistance value even if continuously used.

Means for Solving the Problems

The inventors engaged in intensive research to achieve the above object and as a result discovered that by reacting a polyether rubber containing epihalohydrin monomer unit in 0.1 mol % or more and a nitrogen atom-containing aromatic heterocyclic compound by kneading in the presence of an acid acceptor containing at least a hydrotalcite having a specific surface area that is controlled to be in a predetermined range, it is possible to produce a polyether rubber having the above characteristics by a high production efficiency and thereby completed the present invention.

That is, according to the present invention, there is provided a method of production of a polyether rubber containing unit expressed by the following general formula (1) in 0.1 mol % or more and less than 30 mol % comprising reacting a polyether rubber containing epihalohydrin monomer unit in 0.1 mol % or more and a nitrogen atom-containing aromatic heterocyclic compound by kneading in the presence of an acid acceptor containing at least a hydrotalcite having a nitrogen adsorption specific surface area as measured by a BET method of 10 m$^2$/g or more using a kneader so as to substitute at least part of halogen atom constituting the epihalohydrin monomer unit with a group containing a cationic nitrogen-containing aromatic heterocyclic ring:

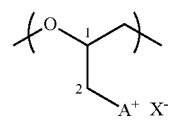

(1)

wherein, in the above general formula (1), A$^+$ is a group containing a cationic nitrogen-containing aromatic heterocyclic ring, where the group containing a cationic nitrogen-containing aromatic heterocyclic ring is bonded with a carbon atom at the "2" position shown in the above general formula (1) through a nitrogen atom constituting the cationic nitrogen-containing aromatic heterocyclic ring, and X$^-$ is any counter anion.

In the method of production of a polyether rubber of the present invention, preferably an amount of the hydrotalcite to be used is 0.1 to 15 parts by weight with respect to 100 parts by weight of the polyether rubber containing epihalohydrin monomer unit in 0.1 mol % or more.

In the method of production of a polyether rubber of the present invention, preferably the hydrotalcite contains at least Mg and Al.

In the method of production of a polyether rubber of the present invention, preferably the nitrogen atom-containing aromatic heterocyclic compound is a five-membered heterocyclic compound or a six-membered heterocyclic compound.

In the method of production of a polyether rubber of the present invention, further, an oxide, hydroxide, and/or carbonate of at least one of magnesium, calcium, and barium may be used in combination as the acid acceptor in a proportion of 0.1 to 5 parts by weight with respect to 100 parts by weight of the polyether rubber containing epihalohydrin monomer unit in 0.1 mol % or more.

In the method of production of a polyether rubber of the present invention, further, magnesium oxide may be used in combination as the acid acceptor in a proportion of 0.1 to 2 parts by weight with respect to 100 parts by weight of the polyether rubber containing epihalohydrin monomer unit in 0.1 mol % or more.

Effects of the Invention

According to the present invention, it is possible to provide a method of production of a polyether rubber used for obtaining a cross-linked rubber with excellent processability, moreover, little variation in the electrical resistance value, a low electrical resistance value, and suppressed increase in the electrical resistance value even if continuously used.

DESCRIPTION OF EMBODIMENTS

<Method of Production of Polyether Rubber>

The method of production of a polyether rubber of the present invention is a method of production of a polyether rubber containing unit expressed by the following general formula (1) in 0.1 mol % or more and less than 30 mol % comprising reacting a polyether rubber containing epihalohydrin monomer unit in 0.1 mol % or more and a nitrogen atom-containing aromatic heterocyclic compound by kneading in the presence of an acid acceptor containing at least a hydrotalcite having a nitrogen adsorption specific surface area as measured by a BET method of 10 m²/g or more so as to substitute at least part of halogen atom constituting the epihalohydrin monomer unit with a group containing a cationic nitrogen-containing aromatic heterocyclic ring:

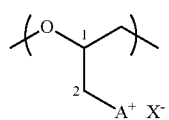

(1)

wherein, in the above general formula (1), A⁺ is a group containing a cationic nitrogen-containing aromatic heterocyclic ring, were the group containing a cationic nitrogen-containing aromatic heterocyclic ring is bonded with a carbon atom at the "2" position shown in the above general formula (1) through a nitrogen atom constituting the cationic nitrogen-containing aromatic heterocyclic ring, and X⁻ is any counter anion.

Note that, below, "a group containing a cationic nitrogen-containing aromatic heterocyclic ring" will sometimes be referred to as an "onium ion-containing group." An onium ion-containing group means a group containing an onium ion structure or a group forming an onium ion structure.

The polyether rubber containing epihalohydrin monomer unit in 0.1 mol % or more used in the present invention can be obtained by ring-opening polymerization of an epihalohydrin monomer by the solution polymerization method, solvent slurry polymerization method and the like. Note that, as explained later, the polyether rubber containing epihalohydrin monomer unit in 0.1 mol % or more used in the present invention is preferably a copolymer obtained by ring-opening polymerization of an ethylene oxide monomer and unsaturated oxide monomer in addition to an epihalohydrin monomer. However, the epihalohydrin monomer has to be subjected to a copolymerization in 0.1 mol % or more.

The epihalohydrin monomer forming the epihalohydrin monomer unit is not particularly limited, but, for example, epichlorohydrin, epibromohydrin, epiiodohydrin, epifluorohydrin and the like. may be mentioned. Among these, epichlorohydrin is preferable. The epihalohydrin monomers may be used singly, or two or more thereof may be used together.

The polymerization catalyst used, when an epihalohydrin monomer is polymerized by ring-opening polymerization is not particularly limited so long as it is a general catalyst for polyether polymerization. As the polymerization catalyst, for example, a catalyst obtained by reacting organic aluminum with water and acetyl acetone (Japanese Patent Publication No. 35-15797); a catalyst obtained by reacting triisobutyl aluminum with phosphoric acid and triethylamine (Japanese Patent Publication No. 46-27534); a catalyst obtained by reacting triisobutyl aluminum with an organic acid salt of diazabicycloundecene and phosphoric acid (Japanese Patent Publication No. 56-51171); a catalyst consisting of a partial hydrolyzate of aluminum alkoxide and an organo zinc compound (Japanese Patent Publication No. 43-2945); a catalyst consisting of an organo zinc cc pound and polyvalent alcohol (Japanese Patent Publication No. 45-7751); a catalyst consisting of dialkyl zinc and water (Japanese Patent Publication No. 36-3394); a catalyst consisting of tributyl tin chloride and tributyl phosphate (Japanese Patent No. 3223978); and the like may be mentioned.

As the solvent for polymerization is not specifically limited if it is inert, for example, aromatic hydrocarbons such as benzene and toluene; saturated linear hydrocarbons such as n-pentane and n-hexane; saturated cyclic hydrocarbons such as cyclopentane and cyclohexane; and the like may be used. Of these, when ring-opening polymerization is carried out by the solution polymerization method, aromatic hydrocarbons are preferably used from the viewpoint of solubility of the polyether rubber. Toluene is more preferable.

The polymerization reaction temperature is preferably 20 to 150° C., while 40 to 130° C. is more preferable. The polymerization can be carried out according to any mode including a batch type, a semi-batch type, a continuous type, and the like.

The polyether rubber containing epihalohydrin monomer unit in 0.1 mol % or more may be any copolymer type of either a block copolymer or random copolymer, but a random copolymer is preferable.

The method of recovering the polyether rubber containing epihalohydrin monomer unit in 0.1 mol % or more from a solvent is not particularly limited. For example, it is carried out by appropriately combining coagulation, filtration, and drying. As a method, of coagulating the polyether rubber from a solvent in which the polyether rubber is dissolved, for example, a common method such as steam stripping or precipitation using a poor solvent can be used. Further, as a method of filtering the polyether rubber from slurry containing the polyether rubber, the method of using in accordance with need, for example, a sieve such as a rotary type screen and a vibrating screen; a centrifugal dehydrator; and the like may be mentioned. As the method of drying the polyether rubber, a dehydration method using a compression type dehydrator such as a roll, Banbury type dehydrator, and screw extruder type dehydrator; a method using a dryer such as a screw type extruder, kneader type dryer, expander type dryer, heat wave type dryer, and reduced pressure type dryer; and the like may be mentioned. The compression type dehydrator and dryer may be each used either singly or in combinations of two or more.

Further, in the method of production of the present invention, such a polyether rubber containing epihalohydrin monomer unit in 0.1 mol % or more and a nitrogen atom-containing aromatic heterocyclic compound are reacted by kneading in the presence of an acid acceptor containing at least a hydrotalcite having a nitrogen adsorption specific surface area as measured by a BET method of 10 m$^2$/g or more to thereby substitute at least part of the halogen atom constituting the epihalohydrin monomer unit with a group containing a cationic nitrogen-containing aromatic heterocyclic ring and thus introduce into the polyether rubber the structural unit expressed by the above general formula (1).

The phrase "reacted by kneading in the presence of an acid acceptor containing at least a hydrotalcite" means that the step of reacting the polyether rubber containing epihalohydrin monomer unit in 0.1 mol % or more and the nitrogen atom-containing aromatic heterocyclic compound includes the step of kneading the polyether rubber and the nitrogen atom-containing aromatic heterocyclic compound in the presence of the acid acceptor containing at least a hydrotalcite. Here, the reaction may be allowed to proceed simultaneously with kneading, or the reaction may be allowed to proceed after kneading.

In the present invention, when the polyether rubber containing epihalohydrin monomer unit in 0.1 mol % or more and the nitrogen atom-containing aromatic heterocyclic compound are reacted by kneading, preferably kneading is performed without using a solvent or the like. Due to this, reaction of these can be performed in a relatively short reaction time, so production by a high production efficiency becomes possible. The kneading machine used in kneading is not particularly limited, and any dry kneading machine such as a kneader, Banbury mixer, open roll, calendar roll, and biaxial kneading machine may be used singly or in combination, but preferably a kneader is used from the viewpoint of being capable of conveniently and favorably kneading the polyether rubber containing epihalohydrin monomer unit in 0.1 mol % or more and the nitrogen atom-containing aromatic heterocyclic compound in the presence of the hydrotalcite.

Note that, as described above, the reaction between the polyether rubber containing epihalohydrin monomer unit in 0.1 mol % or more and the nitrogen atom-containing aromatic heterocyclic compound may be performed simultaneously with kneading, or may be performed separately after kneading. In the case of reacting separately, any dry kneading machine mentioned above may be continuously used as-is, or the reaction may be performed using an oven or a press-forming machine.

Further, the method of charging the polyether rubber containing epihalohydrin monomer unit in 0.1 mol % or more, the nitrogen atom-containing aromatic heterocyclic compound (below, sometimes referred to as an "onium-forming agent"), and the acid acceptor containing at least a hydrotalcite having a nitrogen adsorption specific surface area as measured by a BET method of 10 m$^2$/g or more into the kneading machine is not particularly limited, but these may be separately and continuously charged as one mode or these may be premixed and the obtained mixture charged as another mode.

In the present invention, the hydrotalcite acts as an acid acceptor that traps hydrogen halides such as hydrogen chloride produced as a byproduct at the time of reacting the polyether rubber containing epihalohydrin monomer unit in 0.1 mol % or more and the nitrogen atom-containing aromatic heterocyclic compound and thereby can suppress degradation of the polyether rubber during reaction when the polyether rubber containing epihalohydrin monomer unit in 0.1 mol % or more and the nitrogen atom-containing aromatic heterocyclic compound are reacted and, moreover, can prevent corrosion of the kneading machine when kneading is performed using the kneading machine.

In the present invention, due to the use of the hydrotalcite as an acid acceptor, the obtained polyether rubber after introduction of an onium ion structure has reduced adhesion to rolls that are used in rubber kneading and processing into a sheet shape when the polyether rubber is mixed with a cross-linking agent and cross-linked, thereby sticking of the polyether rubber to the rolls can be prevented, and therefore the processability of the polyether rubber can be improved. Further, the use of the hydrotalcite as an acid acceptor makes it possible to obtain a cross-linked rubber with which an increase in the electrical resistance value when the cross-linked rubber is continuously used is suppressed.

The hydrotalcite used in the present invention is not particularly limited but, for example, a compound expressed by the following general formula (2) can be used.

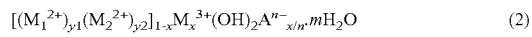

$$[(M_1^{2+})_{y1}(M_2^{2+})_{y2}]_{1-x}M_x^{3+}(OH)_2A^{n-}_{x/n} \cdot mH_2O \quad (2)$$

In the above general formula (2), $M_1^{2+}$ and $M_2^{2+}$ each independently indicate a divalent metal such as Mg, Zn, Ca, Sr, Ca, Fe, Mn, Co, Ni, Sn, Pb, Cd, and Ba; $M_x^{3+}$ indicates a trivalent metal such as Al and Fe; and $A^{n-}$ indicates an anion having a valency of n. Examples of the $A^{n-}$ anion include a chlorine ion, a carbonate ion, an organic acid ion, and the like. Preferably, x, y1, y2, and m are values expressed by the following formulae (3) to (5). Note that y2 may be 0.

$$0<x<0.5 \quad (3)$$

$$0.5 \leq y1+y2 \leq 1 \quad (4)$$

$$0 \leq m < 2 \quad (5)$$

Preferably, the hydrotalcite expressed by the general formula (2) contains at least Mg and Al. That is, in the hydrotalcite expressed by the general formula (2), preferably $M_1^{2+}$ is $Mg^{2+}$, and preferably $M_2^{2+}$ is not contained (y2 is 0 in the general formula (2)). Further, $M_x^{3+}$ is preferably $Al^{3+}$. In the hydrotalcite expressed by the general formula (2), when $M_1^{2+}$ is $Mg^{2+}$, $M_2^{2+}$ is not contained, and $M_x^{3+}$ is $Al^{3+}$, the atomic ratio of Mg to Al contained in the hydrotalcite (Mg/Al) is preferably 2 to 4.

The specific surface area of the hydrotalcite used in the present invention may be 10 m$^2$/g or more, and is preferably 12 m$^2$/g or more and more preferably 14 m$^2$/g or more, in terms of a nitrogen adsorption specific surface area as measured by a BET method in accordance with ASTM D 3037-81. By setting the specific surface area of the hydrotalcite to be in the above range, degradation of the polyether rubber during reaction can be more effectively suppressed when the polyether rubber containing epihalohydrin monomer unit in 0.1 mol % or more and the nitrogen atom-containing aromatic heterocyclic compound are reacted, and, thereby, the Mooney viscosity of the obtained polyether rubber (a polyether rubber containing the unit expressed by the above general formula (1) in 0.1 mol % or more and less than 30 mol %) can be in an appropriate range, thus making it possible to suppress sticking of the polyether rubber to rolls and significantly improve the processability of the polyether rubber. The upper limit of the specific surface area of the hydrotalcite used in the present invention is not particularly limited, but is preferably 200 m²/g or less and more preferably 150 m²/g or less in terms of a nitrogen adsorption specific surface area as measured by a BET method. As a method of increasing the specific surface area of particles, a method of reducing the particle diameter of particles is generally known, but, normally, there is a tendency that a smaller particle diameter of particles results in formation of finer powder and makes handling difficult, and also formation of powder with a certain level of fineness or more is industrially difficult. It is thus preferable to set the upper limit of the specific surface area of the hydrotalcite to be in the above range and control the particle diameter of the hydrotalcite to an appropriate size.

Examples of the hydrotalcite expressed by the general formula (2) and having a specific surface area in the above range include product name "Kyowaad 500SH" (manufactured by Kyowa Chemical Industry Co., Ltd.), product name "DHT-4C" (manufactured by Kyowa Chemical Industry Co., Ltd.), product name "DHT-4A-2" (manufactured by Kyowa Chemical Industry Co., Ltd.), and the like.

The amount of the hydrotalcite to be used is not particularly limited, but it is preferably 0.1 to 15 parts by weight with respect to 100 parts by weight of the polyether rubber which is used, more preferably 0.5 to 10 parts by weight, and even more preferably 1 to 5 parts by weight. If the amount of the hydrotalcite to be used is too small, the adhesion of the obtained polyether rubber is increased, thus the polyether rubber is liable to stick to the rolls, and also the effect of preventing corrosion of the kneading machine is liable to end up falling. On the other hand, if the amount is too large, the rubber is liable to become too hard.

In the present invention, in addition to the above-mentioned hydrotalcite, a compound other than the hydrotalcite may be used in combination as an acid acceptor. As acid acceptors usable in combination with the hydrotalcite, for example, oxide, hydroxide, carbonate, carboxylate, silicate, borate, phosphite, metaborate, and the like of a Group II metal of the Periodic Table such as magnesium oxide, calcium oxide, magnesium hydroxide, calcium hydroxide, barium hydroxide, magnesium carbonate, barium carbonate, calcium carbonate, calcium borate, calcium phthalate, calcium phosphite, calcium silicate, magnesium silicate, magnesium borate, magnesium metaborate, calcium metaborate, and barium metaborate; oxide, hydroxide, carbonate, carboxylate, silicate, borate, phosphite, metaborate, and the like of a Group XII metal of the Periodic Table such as zinc stearate and zinc oxide; oxide, basic carbonate, basic carboxylate, basic phosphite, basic sulfite, and the like of a Group XIV metal of the Periodic Table such as stannous oxide, basic stannous carbonate, stannous stearate, basic stannous phosphite, basic stannous sulfite, silicon oxide, silicon stearate; aluminum hydroxide gel compounds; and the like may be mentioned. Such acid acceptors usable in combination with the hydrotalcite can be used singly, or in combinations of two or more.

Among these acid acceptors usable in combination with the hydrotalcite, since with even a small amount of addition, the corrosion preventing effect is large, oxides, hydroxides, or carbonates of magnesium, calcium, or barium are preferable, oxides or carbonates of magnesium or calcium are more preferable, and magnesium oxide is particularly preferable from the viewpoint of being inexpensive and thus becoming cost-advantageous.

In the present invention, in addition to the above-mentioned hydrotalcite, the use of a compound other than the hydrotalcite, which is more inexpensive, in combination as an acid acceptor makes it possible to reduce the amount of the hydrotalcite to be used while maintaining the effects of using the hydrotalcite as an acid acceptor (such as the effect of suppressing degradation of the polyether rubber during reaction, and the effect of preventing corrosion of the kneading machine when the obtained polyether rubber is kneaded by the kneading machine), thus becoming cost-advantageous and also enabling a polyether rubber having excellent processability to be obtained.

When, in addition to the above-mentioned hydrotalcite, a compound other than the hydrotalcite is used in combination as an acid acceptor, the amount of the compound other than the hydrotalcite to be used is preferably 0.1 to 6 parts by weight with respect to 100 parts by weight of the polyether rubber which is used, more preferably 0.1 to 4 parts by weight, and even more preferably 0.1 to 2 parts by weight. By setting the amount of the compound other than the hydrotalcite to be used to be in the above range, various characteristics of the obtained cross-linked rubber can be favorable while effectively preventing the obtained polyether rubber from sticking to the rolls.

When, in addition to the above-mentioned hydrotalcite, a compound other than the hydrotalcite is used in combination as an acid acceptor, the ratio of the amount of the compound other than the hydrotalcite to be used to that of the hydrotalcite (the weight of the compound other than the hydrotalcite used/the weight of the hydrotalcite used) is preferably 0.01 to 10, more preferably 0.01 to 5, and even more preferably 0.01 to 1.

The nitrogen atom-containing aromatic heterocyclic compound (below, sometimes referred to as the "onium-forming agent") used in the present invention is not particularly limited so long as it is an aromatic heterocyclic compound containing a nitrogen atom. For example, a five-membered heterocyclic compound such as imidazole, 1-methylimidazole, pyrrole, 1-methylpyrrole, thiazole, oxazole, pyrazole, and isoxazole; a six-membered heterocyclic compound such as pyridine, pyrazine, pyrimidine, pyridazine, triazine, and 2,6-lutidine; a condensed heterocyclic con pound such as quinoline, isoquinoline, quinoxaline, quinazoline, cinnoline, purine, indole, isoindole, benzimidazole, benzoxazole, and benzisoxazole; and the like may be mentioned. Among these, the five-membered heterocyclic compound and the six-membered heterocyclic compound are preferable. From the viewpoint of the stability of the substance after the reaction, 1-methylimidazole is more preferable.

The amount of the onium-forming agent to be used is not particularly limited, but, in accordance with the onium-forming agent which is used, the structure of the polyether rubber, the substitution ratio of the onium ion-containing group in the target polyether rubber, and the like, it is preferably determined so that the ratio of content of the unit expressed by the above general formula (1) becomes 0.1 mol % or more and less than 30 mol % in range. Specifically, the amount of the onium-forming agent to be used is usually 0.1 to 50 moles with respect to 1 mole of halogen atom constituting the epihalohydrin monomer unit of the polyether rubber which is used, preferably 0.1 to 30 moles in range if the amount of the onium-forming agent is too small, the substitution reaction becomes slow and a desired composition of the polyether rubber having onium ion-containing groups (below, sometimes referred to as the "cationized polyether rubber") is liable to be unable to be obtained. On the other hand, if the amount of the onium-forming agent is too large, it is liable to become difficult to remove the unreacted onium-forming agent from the obtained cationized polyether rubber.

The reaction temperature when the reaction is carried out by a kneading machine or the like is preferably 150° C. or more, more preferably 160° C. or more, and even more preferably 170° C. or more. The upper limit of the reaction temperature is preferably 250° C. or less, and more preferably 200° C. or less. The reaction time is preferably 1 to 120 minutes, and more preferably 1 to 60 minutes. In the present invention, the reaction between the polyether rubber containing epihalohydrin monomer unit in 0.1 mol % or more and the onium-forming agent is performed in the presence of the acid acceptor containing at least a hydrotalcite using a kneading machine or the like. Therefore, even when the reaction is performed at a relatively high temperature and in a short time as explained above, it is possible to obtain a polyether rubber having onium ion-containing group with a desired composition without causing corrosion of the kneading machine or the like, so the reaction temperature and the reaction time are preferably controlled to be in the above ranges. If the reaction temperature is too low, the substitution reaction becomes slow and a desired composition of the cationized polyether rubber is liable to be unable to be obtained. On the other hand, if the reaction temperature is too high, the polyether rubber which is used is liable to break down or the onium-forming agent is liable to evaporate. Further, if the reaction time is too short, the reaction becomes incomplete and a desired composition of the cationized polyether rubber is liable to be unable to be obtained. On the other hand, if the reaction time becomes too long, the production efficiency is liable to end up falling and also the polyether rubber is liable to break down.

Note that, in the present invention, when a kneading machine is used to perform the kneading and reaction, the kneading causes the kneaded material itself to generate heat, so it is desirable to consider such generation of heat and adjust the heating temperature of the kneading machine to thereby make the reaction temperature the desired temperature. The reaction temperature when a kneading machine is used to perform the kneading and reaction can, for example, be found by measurement of the temperature of the just discharged cationized polyether rubber which is discharged from the kneader.

In the above way, according to the present invention, it is possible to obtain a polyether rubber containing unit expressed by the above general formula (1) (cationized polyether rubber) in 0.1 mol % or more and less than 30 mol %. Since the polyether rubber obtained by the method of production of the present invention contains the unit expressed by the above general formula (1) in 0.1 mol % or more and less than 30 mol %, the cross-linked rubber obtained using the polyether rubber obtained by the method of production of the present invention has little variation in the electrical resistance value, is low in the electrical resistance value, and can suppress an increase in the electrical resistance value even if continuously used.

In the unit expressed by, the above general formula (1), $A^+$ is a group containing a cationic nitrogen-containing aromatic heterocyclic ring. This group containing a cationic nitrogen-containing aromatic heterocyclic ring is bonded with the carbon atom at the "2" position which is shown in the above general formula (1) through a nitrogen atom constituting the cationic nitrogen-containing aromatic heterocyclic ring. The nitrogen-containing aromatic heterocyclic ring in the cationic nitrogen-containing aromatic heterocyclic ring in the group containing a cationic nitrogen-containing aromatic heterocyclic ring is not particularly limited so long as it has a nitrogen atom in the ring and has an aromatic nature. For example, other than the nitrogen atom which is bonded with the carbon atom at the "2" position which is shown in the above general formula (1) in the heterocyclic ring, this may have another nitrogen atom, may have a hetero atom other than a nitrogen atom such as an oxygen atom and sulfur atom, and further, may have at least part of the atoms which form the heterocyclic ring substituted by substituents. Further, a polycyclic structure where two or more rings are condensed may also be used. As the structure of such a nitrogen-containing aromatic heterocyclic ring, for example, a five-membered heterocyclic ring such as an imidazole ring, pyrrole ring, thiazole ring, oxazole ring, pyrazole ring, and isoxazole ring; a six-membered heterocyclic ring such as a pyridine ring, pyrazine ring, pyrimidine ring, pyridazine ring, and triazine ring; a condensed heterocyclic ring such as a quinoline ring, isoquinoline ring, quinoxaline ring, quinazoline ring, cinnoline ring, purine ring, indole ring, isoindole ring, benzimidazole ring, benzoxazole ring, and benzisoxazole ring; and the like may be mentioned. Among these, a five-membered heterocyclic ring and six-membered heterocyclic ring are preferable, while an imidazole ring is more preferable. In the polyether rubber, in unit expressed by the above general formula (1), $A^+$ is independent from each other. In the polyether rubber, there may be two or more of groups containing a cationic nitrogen-containing aromatic heterocyclic ring.

The substituent of the above nitrogen-containing aromatic heterocyclic ring is not particularly limited, but, for example, an alkyl group; cycloakyl group; alkenyl group; aryl group; aryl group; arylalkyl group; alkylaryl group; alkoxyl group; alkoxyalkyl group; aryloxy group; alkanol group; hydroxyl group; carbonyl group; alkoxycarbonyl group; amino group; imino group; nitrile group; alkylsilyl group; halogen atom; and the like may be mentioned.

In the present invention, in the above general formula (1), as the group containing a cationic nitrogen-containing aromatic heterocyclic ring as shown by $A^+$, a group expressed by the following general formula (6) is preferable.

(6)

In the above general formula (1), N— which is shown in the above genera formula (6) is bonded with the carbon atom at the "2" position which is shown in the above general formula (1). Further, R which is shown in the above general formula (6) indicates a hydrogen atom or a $C_1$ to $C_{20}$ hydrocarbon group.

R which is shown in the above general formula (6) is preferably a $C_1$ to $C_{10}$ alkyl group, and more preferably a methyl group.

In the polyether rubber obtained by the method of production of the present invention, the ratio of content of unit expressed by the above general formula (i) is 0.1 mol % or more and less than 30 mol % in the total monomer unit, preferably 0.1 to 20 mol %, and particularly preferably 0.1 to 5 mol %. If the ratio of content of the unit expressed by the above general formula (1) is within the above range, a polyether rubber is obtained which can give a cross-linked rubber which has a small compression set, which has a low electrical resistance value, and which can suppress the increase in the volume resistivity value caused by electric current. On the other hand, if the ratio of content of the unit expressed by the above general formula (1) is too small, sometimes the obtained cross-linked rubber becomes high in the volume resistivity value and the electrical resistance value increases when voltage is applied continuously. Further, if the ratio of content of the unit expressed by the above general formula (1) is too large, sometimes the polyether rubber becomes hard and the properties of the rubber elastomer are lost.

The "any counter anion" expressed by $X^-$ in the above general formula (1) is a compound or atom which has a negative charge and which is bonded with $A^+$ by an ion bond and is not particularly limited except that it has a negative charge. The counter anion forms an ionizing ion bond, and therefore a known ion exchange reaction can be used for anion exchange with any counter anion at least in part. At the stage of the onium-forming agent and the polyether rubber containing epihalohydrin monomer unit in 0.1 mol % or more being kneaded and reacted in the presence of the acid acceptor containing at least a hydrotalcite by a kneading machine or the like and the reaction ending, X of the above general formula (1) is a halogen atom, but a known anion exchange reaction may be performed with respect to the counter anion of $A^+$, that is, the halide ion. The anion exchange reaction can be performed by mixing an ionic compound having ionizability with the polyether rubber having onium ion-containing groups. The conditions for performing the anion exchange reaction are not particularly limited, but should be determined according to the ionic compound which is used, the structure of the polyether rubber, the targeted substitution rate of the counter anions of $A^+$, and the like. The reaction may be performed by only the ionic compound and d the polyether rubber having onium ion-containing groups, but other compounds such as an organic solvent may be included as well. The amount of the ionic compound to be used is not particularly limited, but is usually 0.01 to 100 moles, preferably 0.02 to 50 moles, and more preferably 0.03 to 10 moles in range with respect to 1 mole of halogen atom constituting the epihalohydrin monomer unit used. If the amount of the ionic compound is too small, the substitution reaction is liable to become harder to proceed. On the other hand, if the amount is too large, removal of the ionic compounds is liable to become difficult.

The pressure at the time of an anion exchange reaction is usually 0.1 to 50 MPa, preferably 0.1 to 10 MPa, and more preferably 0.1 to 5 MPa. The temperature at the time of the reaction is usually −30 to 200° C., preferably −15 to 180° C., and more preferably 0 to 150° C. The reaction time is usually 1-minute to 1000 hours, preferably 3 minutes to 100 hours, more preferably 5 minutes to 10 hours, and even more preferably 5 minutes to 3 hours.

The anion species of the counter anions is not particularly limited, but for example, halide ions such as fluoride ions, chloride ions, bromide ions, and iodide ions; sulfate ions; sulfite ions; hydroxide ions; carbonate ions; hydrogencarbonate ions; nitrate ions; acetate ions; perchlorate ions; phosphate ions; alkyloxy ions; trifluoromethane sulfonate ions; bistrifluoromethane sulfonimide ions; hexafluorophosphate ions; tetrafluoroborate ions; and the like may be mentioned.

As the method of investigating the ratio of content of the unit expressed by the above general formula (1) in the polyether rubber obtained by the method of production of the present invention (below, sometimes referred to as the "content ratio of the onium ion unit"), a known method may be used. For simple and quantitative determination of the content ratio of the onium ion unit, content of an onium ion-containing group can be quantified by $^1$H-NMR measurement of the polyether rubber obtained by the method of production of the present invention. Specifically, from the integrated values of the proton derived from the polyether chain that is a main chain of the cationized polyether rubber, mole number B1 of the entire monomer unit in the polymer (including the onium ion unit) is calculated. Subsequently, from the integrated values of the proton derived from an onium ion-containing group, mole number B2 of the onium ion unit introduced (the unit expressed by the above general formula (1)) is calculated. By dividing the mole number B2 of the onium ion unit introduced (the unit expressed by the above general formula (1)) by the mole number B1 of the entire monomer unit in the polymer (including the onium ion unit), the content ratio of the onium ion unit can be calculated based on the following formula.

Content ratio of onium ion unit (mol %)=100×B2/B1

Further, when the onium-forming agent which is used is not consumed by any other reaction other than the substitution reaction of an onium ion-containing group under the reaction conditions described above, the molar amount of the consumed onium-forming agent will be the same as the molar amount of the halogen atom substituted with the onium ion-containing group. Thus, by calculating the molar amount of the consumed onium-forming agent by subtracting the residual molar amount A2 after the reaction from the molar amount A1 added before the reaction, and dividing the resulting value by molar amount P of the entire monomer unit in the polyether rubber before reaction with the onium-forming agent (below, sometimes referred to as the "base polyether rubber"), the content ratio of the onium ion unit can be also calculated based on the following formula.

Content ratio of onium ion unit (mol %)=100×(A1−A2)/P

Molar amount of consumption can be measured by a known measurement method. The reaction ratio can be measured by gas chromatography (GC) equipped with a capillary column and a flame ionization detector (FID).

Further, the polyether rubber obtained by the method of production of the present invention is preferably a copolymer having unit expressed by the above general formula (1) as an essential component and containing unit expressed by the above general formula (1) and [epihalohydrin monomer unit and/or unsaturated oxide monomer unit], more preferably is a copolymer containing the unit expressed by the above general formula (1), ethylene oxide monomer unit, and [epihalohydrin monomer unit and/or unsaturated oxide monomer unit], and is even more preferably a copolymer containing unit expressed by the above general formula (1), ethylene oxide monomer unit, epihalohydrin monomer unit, and unsaturated oxide monomer unit.

The polyether rubber obtained by the method of production of the present invention preferably contains cross-linkable monomer unit. As the cross-linkable monomer unit, epihalohydrin monomer unit and/or unsaturated oxide monomer unit are preferable.

As the epihalohydrin monomer, the above-mentioned epihalohydrin monomers which can be used for the polyether rubber containing epihalohydrin monomer unit in 0.1 mol % or more can be used. In the polyether rubber obtained by the method of production of the present invention, the ratio of content of the epihalohydrin monomer unit is preferably 99.9 to 0 mol % in the total monomer unit, more preferably 78.5 to 10 mol %, and particularly preferably 57.3 to 15 mol %. If the ratio of content of the epihalohydrin monomer unit is in the above range, a polyether rubber which can give a cross-linked rubber which can suppress the increase in the volume resistivity value caused by electric current is obtained. On the other hand, if the ratio of content of the epihalohydrin monomer unit is too large, sometimes the obtained cross-linked rubber increases in the volume resistivity value, while if it is too small, sometimes the obtained cross-linked rubber becomes insufficient in cross-linking and it becomes difficult to maintain the shape of the cross-linked rubber.

The unsaturated oxide monomer which forms the unsaturated oxide monomer unit is not particularly limited so long as it contains in the molecule at least one carbon-carbon unsaturated bond (except carbon-carbon unsaturated bond of aromatic ring) and at least one epoxy group, but, for example, alkenyl glycidyl ethers such as allyl glycidyl ether and butenyl glycidyl ether; alkenyl epoxides such as 3,4-epoxy-1-butene, 1,2-epoxy-5-hexene, and 1,2-epoxy-9-decene; and the like may be mentioned. Among these, alkenyl glycidyl ethers are preferable, while an allyl glycidyl ether is more preferable. The unsaturated oxide monomer may be used singly, or two or more thereof may be used together. The ratio of content of the u saturated oxide monomer unit in the polyether rubber obtained by the method of production of the present invention is preferably 15 to 0 mol % in the total monomer unit, more preferably 12 to 1 mol %, and particularly preferably 10 to 2 mol %. If the ratio of content of the unsaturated oxide monomer unit in the polyether rubber is in the above range, a polyether rubber which is excellent in cross-linkability is obtained. On the other hand, if the ratio of content of the unsaturated oxide monomer unit is too small, the obtained cross-linked rubber sometimes deteriorates in compression set. Further, if the ratio of content of the unsaturated oxide monomer unit is too large, during the polymerization reaction, a gelling reaction (3 dimensional cross-linking reaction) and the like easily occur in the polymer molecules or among polymer molecules and the shapeability is liable to drop.

Further, when the polyether rubber obtained by the method of production of the present invention is used as a material of a conductive member, particularly a conductive roll, the polyether rubber obtained by the method of production of the present invention preferably contains ethylene oxide monomer unit from the viewpoint of low electrical resistance.

The ethylene oxide monomer unit are unit formed by an ethylene oxide monomer. In the polyether rubber obtained by the method of production of the present invention, the ratio of content of the ethylene oxide monomer unit is preferably 90 to 0 mol % in the total monomer unit, more preferably 80 to 20 mol %, and particularly preferably 75 to 40 mol %. If the ratio of content of the ethylene oxide monomer unit in the polyether rubber is in the above range, a polyether rubber excellent in low electrical resistance is obtained. On the other band, if the ratio of content of the ethylene oxide monomer unit is too small, the effect of reduction of the electrical resistance value of the obtained cross-linked rubber becomes difficult to obtain. Further, if the ratio of content of the ethylene oxide monomer unit is too large, production of the polyether rubber is liable to become difficult.

The polyether rubber obtained by the method of production of the present invention may also be a copolymer containing, in addition to the unit expressed by the above general formula (1), epihalohydrin monomer unit, unsaturated oxide monomer unit, and ethylene oxide monomer unit, in accordance with need, other monomer unit which can copolymerize with the unit expressed by the above general formula (1) and the monomer unit. Among these other monomer unit, alkylene oxide monomer unit excluding ethylene oxide are preferable. The alkylene oxide monomer forming the alkylene oxide monomer unit excluding ethylene oxide is not particularly limited, but, for example, linear or branched alkylene oxide such as propylene oxide, 1,2-epoxybutane, 1,2-epoxy-4-chloropentane, 1,2-epoxyhexane, 1,2-epoxyoctane, 1,2-epoxydecane, 1,2-epoxyoctadecane, 1,2-epoxyeicosane, 1,2-epoxyisobutane, and 2,3-epoxyisobutane; cyclic alkylene oxide such as 1,2-epoxycyclopentane, 1,2-epoxycyclohexane, and 1,2-epoxycyclododecane; glycidyl ether having a linear or branched alkyl such as butyl glycidyl ether, 2-ethylhexyl glycidyl ether, 2-methyloctyl glycidyl ether, neopentyl glycol diglycidyl ether, decyl glycidyl ether, and stearyl glycidyl ether; glycidyl ether having an oxyethylene side chain such as ethylene glycol diglycidyl ether, diethylene glycol diglycidyl ether, and polyethylene glycol diglycidyl ether; and the like may be mentioned. Among these, linear alkylene oxide is preferable, while propylene oxide is more preferable. These alkylene oxide monomers may be used singly, or two or more thereof may be used together. In the polyether rubber obtained by the method of production of the present invention, the ratio of content of the alkylene oxide monomer unit excluding ethylene oxide is preferably 30 mol % or less in the total monomer unit, more preferably 20 mol % or less, and even more preferably 10 mol % or less. If the ratio of content of the alkylene oxide monomers excluding ethylene oxide in the polyether rubber is too large, the obtained cross-linked rubber is liable to increase in the volume resistivity value.

Further, the other copolymerizable monomers other than an alkylene oxide monomer are not particularly limited, but for example, aryl epoxides such as styrene oxide and phenylglycidyl ether; and the like may be mentioned. In the polyether rubber obtained by the method of production of the present invention, the ratio of content of the other copolymerizable monomer other than an alkylene oxide monomer is preferably 20 mol % or less in the total monomer unit, more preferably 10 mol % or less, and even more preferably 5 mol % or less.

The polyether rubber obtained by the method of production of the present invention preferably has a weight average molecular weight of 200,000 to 2,000,000, and more preferably 400,000 to 1,500,000. If the weight average molecular weight is too high, the Mooney viscosity becomes higher and the forming process is liable to become difficult (for example, when the obtained polyether rubber is processed by pressing, injection molding, or the like, the polyether rubber becomes unlikely to flow, and molding according to the mold is liable to become impossible). On the other hand, if the weight average molecular weight is too low, the obtained cross-linked rubber is liable to deteriorate in compression set.

The polyether rubber obtained by the mete method of production of the present invention preferably has a Mooney viscosity (polymer Mooney viscosity ML1+4, 100° C.) of 10 to 120, and more preferably 20 to 90. If the Mooney viscosity is too high, the rubber becomes inferior in forming processability (for example, when the obtained polyether rubber is processed by pressing, injection molding, or the like, the polyether rubber becomes unlikely to flow, and molding according to the mold is liable to become impossible), and forming for conductive member applications becomes difficult. Further, swell (that is, the diameter of an extruded article is larger than the diameter of a die during extrusion molding) occurs and the dimensional stability is liable to fall. On the other hand, if the Mooney viscosity is too low, the obtained cross-linked rubber is liable to fall in mechanical strength, and, also, for example, in the case where the obtained polyether rubber is formed into a roll shaped cross-linked rubber, smoothly finishing the surface is liable to become difficult when the surface of the cross-linked rubber is polished.

<Cross-Linkable Rubber Composition>

Further, in the present invention, the polyether rubber obtained by the method of production of the present invention may have a cross-linking agent added to it to obtain a cross-linkable rubber composition.

The cross-linking agent which is used in the present invention may be suitably selected according to the presence of the above-mentioned cross-linkable monomer unit, type of the same, and the like, but is not particularly limited so long as it is one which can cross-link the polyether rubber obtained by the method of production of the present invention. As such a cross-linking agent, for example, sulfur such as powdery sulfur, precipitated sulfur, colloidal sulfur, insoluble sulfur, and highly dispersed sulfur; sulfur-containing compounds such as sulfur monochloride, sulfur dichloride, morpholine disulfide, alkyl phenol disulfide, dibenzothiazyl disulfide, caprolactam disulfide, phosphorus-containing polysulfide, and polymer polysulfides; organic peroxides such as dicumyl peroxide and di-t-butyl peroxide; quinone dioximes such as p-quinone dioxime and p,p'-dibenzoylquinone dioxime; organic polyvalent amine compounds such as triethylenetetramine, hexamethylene diamine carbamate, and 4,4'-methylene bis-o-chloroaniline; triazine compounds such as s-triazine-2,4,6-trithiol; an alkyl phenol resins having a methylol group; and the like may be mentioned. Among these, sulfur, a sulfur-containing compound, or a triazine compound is preferable. When an unsaturated oxide monomer is used as a cross-linkable monomer, sulfur or a sulfur-containing compound is more preferable. These cross-linking agents are used singly, or in combinations of two or more. The addition ratio of the cross-linking agent is preferably 0.1 to 10 parts by weight with respect to 100 parts by weight of the polyether rubber obtained by the method of production of the present invention, more preferably 0.2 to 7 parts by weight, and even more preferably 0.3 to 5 parts by weight. If the amount of the cross-linking agent to be added is too small, the cross-linking rate is liable to become slow, productivity of the obtained cross-linked rubber may be lowered. Further, when the cross-linked rubber is used after grinding, the grindability may be impaired. On the other hand, if the amount of the cross-linking agent to be added is too large, the obtained cross-linked rubber may become higher in hardness or the cross-linking agent may bloom.

When sulfur or a sulfur-containing compound is used as a cross-linking agent, it is preferable to use a cross-linking acceleration aid and a cross-linking accelerator in combination. As the cross-linking acceleration aid, although not specifically limited, for example, zinc oxide, stearic acid, and the like may be mentioned. As the cross-linking accelerator, for example, although not specifically limited, cross-linking accelerators such as guanidine-based; aldehyde/amine-based; aldehyde/ammonia-based; thiazole-based; sulfenamide-based; thiourea-based; thiuram-based; and dithiocarbamic acid salt-based cross-linking accelerators may be used. The cross-linking acceleration aid and cross-linking accelerator may be used singly, or two or more thereof may be used together.

The amounts of each of the cross-linking acceleration aid and cross-linking accelerator to be used are not particularly limited, but are preferably 0.01 to 15 parts by weight, and more preferably 0.1 to 10 parts by weight, with respect to 100 parts by weight of the polyether rubber obtained by the method of production of the present invention. If the amounts of the cross-linking acceleration aid and cross-linking accelerator to be used are too large, the cross-linking rate is liable to become too fast and a bloom is liable to form on the surface of the obtained cross-linked rubber. On the other hand, if the amounts are too small, the cross-linking rate becomes slow and the productivity becomes inferior, the cross-linking does not sufficiently proceed, and the obtained cross-linked rubbers are liable to become inferior in mechanical properties.

The cross-linkable rubber composition may contain, in a range not impairing the effects of the present invention, a diene-based rubber such as a butadiene rubber, styrene butadiene rubber, chloroprene rubber, isoprene rubber, natural rubber, acrylonitrile butadiene rubber, butyl rubber, or a partially hydrogenated product of those rubbers (for example, a hydrogenated nitrile rubber); a rubber other than the diene-based rubber such as an ethylene propylene rubber, acrylic rubber, polyether-based rubber (excluding the polyether rubber obtained by the method of production of the present invention), fluoro rubber, or silicone rubber; a thermoplastic elastomer such as an olefin-based thermoplastic elastomer, styrene-based thermoplastic elastomer, vinyl chloride-based thermoplastic elastomer, polyester-based thermoplastic elastomer, polyamide-based thermoplastic elastomer, or polyurethane-based thermoplastic elastomer; and a resin such as polyvinyl chloride, a cumarone resin, or a phenol resin. The rubber, thermoplastic elastomer, and resin may be used singly or in combinations of two or more. Total content of then is preferably 100 parts by weight or less, more preferably 50 parts by weight or less, and particularly preferably 20 parts by weight or less with respect to 100 parts by weight of the polyether rubber obtained by the method of production of the present invention.

Further, the cross-linkable rubber composition may contain another additive usually added to known rubbers in addition to the above-mentioned additives. Such an additive is not particularly limited, but for example, a filler; acid acceptor; reinforcing agent; antioxidant; absorbing agent; light stabilizer; tackifier; surfactant; conductivity imparting material; electrolyte material; colorant (dye and pigment); flame retardant; anti-static agent; and the like may be mentioned.

The cross-linkable rubber composition can be prepared by mixing and kneading a cross-linking agent and various additives which are used in accordance with need into the polyether rubber obtained by the method of production of the present invention by a desired method. For example, the additives other than the cross-linking agent and cross-linking accelerator may be kneaded with the polyether rubber, then the cross-linking agent and cross-linking accelerator may be mixed with the mixture to obtain the cross-linkable rubber composition. At the time of mixing and kneading, for example, any kneading/molding machine such as a kneader, Banbury mixer, open roll, calendar roll, and extruder may be used singly or in combination for kneading and molding. The kneading temperature of the additives other than the cross-linking agent and cross-linking accelerator and the polyether rubber is preferably 20 to 200° C., and more preferably 20 to 150° C., while the kneading time is preferably 30 seconds to 30 minutes. The mixing temperature of the kneaded mixture and the cross-linking agent and cross-linking accelerator is preferably 100° C. or less. 0 to 80° C. is more preferable.

<Cross-Linked Rubber>

Further, in the present invention, it is possible to cross-link the cross-linkable rubber composition obtained in the above way to obtain a cross-linked rubber.

The method of cross-linking the cross-linkable rubber composition is not specifically limited. The cross-linking may be carried out either simultaneously with molding or after molding. The temperature for molding is preferably 20 to 200° C., and more preferably 40 to 180° C. The heating temperature for cross-linking is preferably 130 to 200° C., and more preferably 140 to 200° C. When the temperature for cross-linking is excessively low, a long time ray be required for cross-linking or the cross-linking density of the cross-linked rubber obtained is liable to be lowered. On the other hand, when the temperature for cross-linking is excessively high, molding defects may be yielded. The cross-linking time varies depending on the cross-linking method, cross-linking temperature, shape, or the like. However, when it is within the range of 1 minute or more and 5 hours or less, it is preferable from the viewpoint of the cross-linking density and production efficiency. As a method of heating, any method selected from press heating, oven heating, steam heating, heat wave heating, microwave heating, and the like may be suitably used.

Further, depending on the shape, size, and the like of the cross-linked rubber, cross-linking may not be fully progressed inside the product even when the cross-linking is found on the surface of the product. In such a case, secondary cross-linking may be carried out by further heating. In carrying out the secondary cross-linking, the heating temperature is preferably 100 to 220° C., and more preferably 130 to 210° C. The heating time is preferably 30 minutes to 5 hours.

The volume resistivity value of the cross-linked rubber obtained in this way is usually $1 \times 10^{4.0}$ to $1 \times 10^{9.5}$ Ω·cm, preferably $1 \times 10^{4.5}$ to $1 \times 10^{8.0}$ Ω·cm, and more preferably $1 \times 10^{5.0}$ to $1 \times 10^{7.2}$ Ω·cm, in terms of the value 30 seconds after the start of application of voltage in the case of making the applied voltage 100 V in a measurement environment of a temperature of 23° C. and humidity of 50%. If the volume resistivity value of the cross-linked rubber is within the above range, a conductive member which is excellent in low electrical resistance property is obtained. On the other hand, if the volume resistivity value of the cross-linked rubber is too high, higher voltage should be applied to obtain the same amount of electric current, causing increased power consumption, and therefore it is undesirable for a conductive member. Further, if the volume resistivity value of the cross-linked rubber is too low, electric current may flow in an undesired direction other than the direction applied with voltage, and thus the function as a conductive member may be impaired.

Further, the increased value in the volume resistivity value of the cross-linked rubber obtained in this way that is caused by electric current is preferably within the range of 0 to 1 in terms of the value obtained by subtracting the $\log_{10}$ (volume resistivity value) obtained 30 seconds after the start of application of voltage from the $\log_{10}$ (volume resistivity value) obtained 15 minutes after the start of application of voltage under the conditions for measuring the volume resistivity value as described above.

The thus obtained cross-linked rubber has little variation in the electrical resistance value, is low in the electrical resistance value, and suppress an increase in the electrical resistance value even if continuously used, so can be suitably used for the conductive member used for a copier, printer, and the like, particularly the conductive roll.

EXAMPLES

Below, Examples and Comparative Examples will be given to more specifically explain the present invention. Note that, in the examples, "parts" are based on weight unless particularly indicated otherwise.

The various properties were evaluated in accordance with the following methods.

[Content Ratio of Onium Ion Unit]

The content ratio of the onium ion unit was measured as follows using a nuclear magnetic resonance apparatus ($^1$H-NMR). 30 mg of a cationized polyether rubber, which had been obtained by the onium-forming reaction, was added to 1.0 mL of dimethylsulfoxide-d6 and shaken for 1 hour for homogenous dissolution. The obtained solution was then measured by $^1$H-NMR to calculate the content ratio of the onium ion unit. First, from the integrated values of the proton derived from the polyether chain, which is, a main chain of the cationized polyether rubber, mole number B1 of the entire monomer unit in the polymer (including the onium ion unit) was calculated. Next, from the integrated values of the proton derived from an onium ion-containing group, mole number B2 of the introduced onium ion unit (the unit expressed by the above general formula (1)) was calculated. Thereafter, by dividing the mole number B2 of the introduced onium ion unit (the unit expressed by the above general formula (1) by the mole number B1 of the entire monomer unit in the polymer (including the onium ion unit), the content ratio of the onium ion unit was calculated based on the following formula.

Content ratio of onium ion unit (mol %)=100×B2/B1

[Mooney Viscosity (Polymer Mooney)]

After the onium-forming reaction, the Mooney viscosity (polymer Mooney) of the obtained cationized polyether rubber was measured in accordance with JIS K 6300-1 (unit in [ML1+4, 100° C.]).

[Evaluation of Roll Processability]

When a sheet-shaped rubber composition was prepared by kneading a rubber composition and a cross-linking agent by open rolls, roll processability was evaluated by visually observing the adhesion of the rubber composition to the open rolls according to the following criteria.

A: The rubber composition had no tackiness and was easily removable from the open rolls.

B: The rubber composition was slightly tacky, but was removable from the open rolls without stopping the operation of the open rolls.

C: The rubber composition was tacky, and was not removable from the open rolls without stopping the operation of the open rolls.

D: The rubber composition was severely tacky, and was not removable from the open rolls, thus being incapable of kneading.

[Measurement of Compression Set]

The rubber composition was formed and cross-linked by a press at a temperature of 160° C. for 30 minutes to obtain a cylindrical cross-linked rubber (a cylindrical, test piece) having a diameter of 29 mm and a height of 12.7 mm. In accordance with JIS K 6262, the obtained cross-linked rubber was left to stand in a 70° C. environment for 22 hours while being compressed 25%, and then released from compression to measure the compression set. A rubber having a smaller compression set value retains a greater elasticity, and is superior as a rubber.

[Volume Resistivity Value]

The rubber composition was formed and cross-linked by a press at a temperature of 160° C. for 30 minutes to obtain a sheet-shaped cross-linked rubber (a sheet-shaped test piece) having a length of 15 cm, a width of 10 cm, and a thickness of 2 mm. The obtained sheet-shaped cross-inked rubber was used to measure the volume resistivity value. The volume resistivity value at $\log_{10}$ was measured. The measurement of the volume resistivity value was performed using a Hiresta-UP/URS probe (manufactured by Mitsubishi Chemical Analytech Co., Ltd.), and as for the measurement conditions, the applied voltage was 100 V (10 V under measurement condition 2), measurement condition 1 had a temperature of 23° C. and a humidity of 50% RH, measurement condition 2 had a temperature of 32° C. and a humidity of 80% RH, measurement condition 3 had a temperature of 10° C. and a humidity of 20% RH, and the values 30 seconds after the start of application of voltage were measured. Also, the difference between the volume resistivity value measured under measurement condition 3 and the volume resistivity value measured under measurement condition 2 was calculated.

[Increased Value in Volume Resistivity Value Caused by Electric Current (23° C., 50% RH)]

The increased value in the volume resistivity value caused by electric current was the value obtained by subtracting the $\log_{10}$ (volume resistivity value) obtained 30 seconds after the start of application of voltage from the $\log_{10}$ (volume resistivity value) obtained 15 minutes after the start of application of voltage under the conditions for measuring the volume resistivity value as described above (measurement condition 1).

Example 1

(Production of Cationized Polyether Rubber 1)

To 25° C. open rolls, 100 parts of a polyether rubber (a1) (product name "Hydrin T 3106", epichlorohydrin rubber containing epichlorohydrin monomer unit in 0.1 mol % or more, manufactured by Zeon Corporation), 2 parts of 4,4'-thiobis(3-methyl-6-t-butylphenol), 2.7 parts of a hydrotalcite (b1) (product name "Kyowaad 500SH" having a specific surface area as measured by a BET method of 102 m$^2$/g, manufactured by Kyowa Chemical Industry Co., Ltd.), 0.5 parts of magnesium oxide, and 1.69 parts of 1-methylimidazole were charged and kneaded for 5 minutes to obtain a sheet-shaped rubber composition.

Then, the sheet-shaped rubber composition obtained above was thermally reacted by a press-forming machine at 175° C. for 20 minutes to thereby cause the polyether rubber (a1) and 1-methylimidazole to react and obtain a cationized polyether rubber 1.

Further, the obtained cationized polyether rubber 1 was measured by $^1$H-NMR in accordance with the above-mentioned method to thereby calculate the content ratio of the onium ion unit. Furthermore, the Mooney viscosity (polymer Mooney) was measured in accordance with the method described above. The results are shown in Table 1.
(Production of Rubber Composition 1 and Cross-Linked Rubber 1)

To a Banbury mixer, 100 parts of the cationized polyether rubber 1 obtained above, 10 parts of carbon black (product name "Seast SO," manufactured by Tokai Carbon Co., Ltd.) as a filler, 5 parts of zinc oxide I (product name "ZnO #1," manufactured by Seido Chemical Industry Co., Ltd.) as a cross-linking acceleration aid, and 0.5 parts of stearic acid as a cross-linking acceleration aid were charged and kneaded at 50° C. for 5 minutes, and the rubber composition was discharged from the Banbury mixer. Then, to 50° C. open rolls, this rubber composition, 0.5 parts of sulfur (product name "Sulfax mPC," manufactured by Tsurumi Chemical Industry Co., Ltd.) as a cross-linking agent, 1 part of morpholine disulfide (product name "Vulnoc R," manufactured by Ouchi Shinko Chemical Industrial Co., Ltd.) as a cross-linking agent, and 1 part of tetraethylthiuram disulfide (product name "Nocceler TET," manufactured by Ouchi Shinko Chemical Industrial Co., Ltd.) and 1.5 parts of dibenzothiazyl disulfide (product name "Nocceler DM," manufactured by Ouchi Shinko Chemical Industrial Co., Ltd.) as cross-linking accelerators were charged and kneaded for 10 minutes to prepare a sheet-shaped rubber composition 1. This rubber composition 1 was cross-linked by being pressed at 160° C. for 30 minutes to prepare a cross-linked rubber 1 (test piece 1), and the compression set, volume resistivity value, and increased value in the volume resistivity value caused by electric current of this test piece 1 were evaluated. The results are shown in Table 1.

Example 2

Except for using 1.8 parts of a hydrotalcite (b2) (product name "DHT-4C" having a specific surface area as measured by a BET method of 15 m$^2$/g, manufactured by Kyowa Chemical Industry Co., Ltd.) in place of the hydrotalcite (b1), the same procedure was followed as in Example 1 to obtain a cationized polyether rubber 2. Further, using the obtained cationized polyether rubber 2, the same procedure was followed as in Example 1 to obtain, and evaluate, a rubber composition 2 and a cross-linked rubber 2. The results are shown in Table 1.

Example 3

Except for changing the amount of the hydrotalcite (b2) to be added from 1.8 parts to 2.4 parts and not adding magnesium oxide, the same procedure was followed as in Example 2 to obtain a cationized polyether rubber 3. Further, using the obtained cationized polyether rubber 3, the same procedure was followed as in Example 1 to obtain, and evaluate, a rubber composition 3 and a cross-linked rubber 3. The results are shown in Table 1.

Example 4

Except for changing the amount of the hydrotalcite (b1) to be added from 2.7 parts to 3.6 parts and not adding magnesium oxide, the same procedure was followed as in Example 1 to obtain a cationized polyether rubber 4. Further, using the obtained cationized polyether rubber 4, the same procedure was followed as in Example 1 to obtain, and evaluate, a rubber composition 4 and a cross-linked rubber 4. The results are shown in Table 1.

Example 5

Except for using 100 parts of a polyether rubber (a2) (product name "Hydrin T 3108", epichlorohydrin rubber containing epichlorohydrin monomer unit in 0.1 mol % or more, manufactured by Zeon Corporation) in place of the polyether rubber (a1), the same procedure was followed as in Example 3 to obtain a cationized polyether rubber 5.

Further, using the obtained cationized polyether rubber 5, the same procedure was followed as in Example 1 to obtain, and evaluate, a rubber composition 5 and a cross-linked rubber 5. The results are shown in Table 1.

Example 6

Except for changing the amount of 1-methylimidazole to be added from 1.69 parts to 0.99 parts, the same procedure was followed as in Example 1 to obtain a cationized polyether rubber 6. Further, using the obtained cationized polyether rubber 6, the same procedure was followed as in Example 1 to obtain, and evaluate, a rubber composition 6 and a cross-linked rubber 6. The results are shown in Table 1.

Example 7

Except for changing the amount of 1-methylimidazole to be added from 1.69 parts to 2.63 parts and changing the amount of the hydrotalcite (b1) to be added from 2.7 parts to 4.0 parts, the same procedure was followed as in Example 1 to obtain a cationized polyether rubber 7. Further, using the obtained cationized polyether rubber 7, the same procedure was followed as in Example 1 to obtain, and evaluate, a rubber composition 7 and a cross-linked rubber 7. The results are shown in Table 1.

Example 8

Except for using 100 parts of the polyether rubber (a2) in place of the polyether rubber (a1), changing the amount of 1-methylmidazole to be added from 1.69 parts to 0.30 parts, changing the amount of the hydrotalcite (b1) to be added from 2.7 parts to 0.5 parts, and changing the amount of magnesium oxide to be added from 0.5 parts to 0.1 parts, the same procedure was followed as in Example 1 to obtain a cationized polyether rubber 8. Further, using the obtained cationized polyether rubber 8, the same procedure was followed as in Example 1 to obtain, and evaluate, a rubber composition 8 and a cross-linked rubber 8. The results are shown in Table 1.

Example 9

Except for changing the amount of 1-methylimidazole to be added from 0.30 parts to 0.60 parts, changing the amount of the hydrotalcite (b1) to be added from 0.5 parts to 1.5 parts, and not adding magnesium oxide, the same procedure was followed as in Example 8 to obtain a cationized polyether rubber 9. Further, using the obtained cationized polyether rubber 9, the same procedure was followed as in Example 8 to obtain, and evaluate, a rubber composition 9 and a cross-linked rubber 9. The results are shown in Table 1.

Example 10

Except for changing the amount of 1-methylimidazole to be added from 0.30 parts to 1.00 parts, changing the amount of the hydrotalcite (b1) to be added from 0.5 parts to 1.6 parts, and changing the amount of magnesium oxide to be added from 0.1 parts to 0.3 parts, the same procedure was followed as in Example 8 to obtain a cationized polyether rubber 10. Further, using the obtained cationized polyether rubber 10, the same procedure was followed as in Example 8 to obtain, and evaluate, a rubber composition 10 and a cross-linked rubber 10. The results are shown in Table 1.

Example 11

Except for using 2.4 parts of a hydrotalcite (b3) (product name "DHT-4A-2" having a specific surface area as measured by a. BET method of 13 $m^2/g$, manufactured by Kyowa Chemical Industry Co., Ltd.) in place of the hydrotalcite (b1) and not adding magnesium oxide, the same procedure was followed as in Example 1 to obtain a cationized polyether rubber 11. Further, using the obtained cationized polyether rubber 11, the same procedure was followed as in Example 1 to obtain, and evaluate, a rubber composition 11 and a cross-linked rubber 11. The results are shown in Table 1.

Comparative Example 1

Except for using 2.4 parts of magnesium oxide and 4 parts of calcium carbonate in place of 2.7 parts of the hydrotalcite (b1) and 0.5 parts of magnesium oxide, the same procedure was followed as in Example 1 to obtain a cationized polyether rubber 12. Further, using the obtained cationized polyether rubber 12, the same procedure was followed as in Example 1 to obtain, and evaluate, a rubber composition 12 and a cross-linked rubber 12. The results are shown in Table 1.

Comparative Example 2

Except for using 2.4 parts of a hydrotalcite (b4) (product name "Magceler" having a specific surface area as measured by a BET method of 9 $m^2/g$, manufactured by Kyowa Chemical Industry Co., Ltd.) in place of 2.7 parts of the hydrotalcite (b1) and not adding magnesium oxide, the same procedure was followed as in Example 1 to obtain a cationized polyether rubber 13. Further, using the obtained cationized polyether rubber 13, the same procedure was followed as in Example 1 to obtain, and evaluate, a rubber composition 13. In Comparative Example 2, production and evaluation of a cross-linked rubber were not performed. The results are shown in Table 1.

Comparative Example 3

Except for using 2.4 parts of a hydrotalcite (b5) (product name "Alcamizer" having a specific surface area as measured by a BET method of 8 $m^2/g$, manufactured by Kyowa Chemical Industry Co., Ltd.) in place of 2.7 parts of the hydrotalcite (b) and not adding magnesium oxide, the same procedure was followed as in Example 1 to obtain a cationized polyether rubber 14. Further, using the obtained cationized polyether rubber 14, the same procedure was followed as in Example 1 to obtain, and evaluate, a rubber composition 14. In Comparative Example 3, production and evaluation of a cross-linked rubber were not performed. The results are shown in Table 1.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Composition | | | | | | | | | | |
| Polyether rubber (a1) "T3106" | (parts) | 100 | 100 | 100 | 100 | | 100 | 100 | | |
| Polyether rubber (a2) "T3108" | (parts) | | | | | 100 | | | 100 | 100 |
| 1-Methylimidazole | (parts) | 1.69 | 1.69 | 1.69 | 1.69 | 1.69 | 0.99 | 2.63 | 0.30 | 0.60 |
| 4,4'-Thiobis(3-methyl-6-t-butylphenol) | (parts) | 2 | 2 | 2 | 2 | 2 | 2 | 2 | 2 | 2 |
| Hydrotalcite (b1) "Kyowaad 500SH" (specific surface area: 102 $m^2/g$) | (parts) | 2.7 | | | 3.6 | | 2.7 | 4.0 | 0.5 | 1.5 |
| Hydrotalcite (b2) "DHT-4C" (specific surface area: 15 $m^2/g$) | (parts) | | 1.8 | 2.4 | | 2.4 | | | | |
| Hydrotalcite (b3) "DHT-4A-2" (specific surface area: 13 $m^2/g$) | (parts) | | | | | | | | | |
| Hydrotalcite (b4) "Magceler" (specific surface area: 9 $m^2/g$) | (parts) | | | | | | | | | |
| Hydrotalcite (b5) "Alcamizer" (specific surface area: 8 $m^2/g$) | (parts) | | | | | | | | | |
| Magnesium oxide | (parts) | 0.5 | 0.5 | | | | 0.5 | 0.5 | 0.1 | |
| Calcium carbonate | (parts) | | | | | | | | | |
| Content ratio of onium ion unit | (mol %) | 1.20 | 1.23 | 1.22 | 1.24 | 1.15 | 0.59 | 2.50 | 0.15 | 0.34 |
| Mooney viscosity ML1 + 4 (100° C.) | | 54 | 77 | 55 | 43 | 59 | 91 | 26 | 45 | 60 |
| Roll processability | | A | A | A | A | A | A | A | A | A |
| Compression set | (%) | 10 | 10 | 10 | 10 | 12 | 11 | 5 | 29 | 25 |
| Volume resistivity value ($\Omega \cdot cm$) | | | | | | | | | | |
| Measurement condition 1: 23° C. 50% RH | ($\Omega \cdot cm$) | 6.7 | 6.7 | 6.8 | 6.7 | 6.6 | 6.8 | 6.7 | 6.7 | 6.7 |
| Measurement condition 2: 32° C. 80% RH | ($\Omega \cdot cm$) | 5.8 | 5.9 | 5.9 | 5.9 | 5.8 | 5.8 | 5.8 | 6.1 | 6.0 |
| Measurement condition 3: 10° C. 20% RH | ($\Omega \cdot cm$) | 7.5 | 7.5 | 7.5 | 7.5 | 7.3 | 7.5 | 7.5 | 7.5 | 7.5 |
| Measurement condition 3 – Measurement condition 2 | ($\Omega \cdot cm$) | 1.7 | 1.6 | 1.6 | 1.6 | 1.5 | 1.7 | 1.7 | 1.4 | 1.5 |
| Increased value in volume resistivity value caused by electric current | | 0.82 | 0.83 | 0.79 | 0.87 | 0.89 | 0.73 | 0.58 | 0.74 | 0.68 |

| | | Example 10 | Example 11 | Comparative Example 1 | Comparative Example 2 | Comparative Example 3 |
|---|---|---|---|---|---|---|
| Composition | | | | | | |
| Polyether rubber (a1) "T3106" | (parts) | | 100 | 100 | 100 | 100 |
| Polyether rubber (a2) "T3108" | (parts) | 100 | | | | |
| 1-Methylimidazole | (parts) | 1.00 | 1.69 | 1.69 | 1.69 | 1.69 |
| 4,4'-Thiobis(3-methyl-6-t-butylphenol) | (parts) | 2 | 2 | 2 | 2 | 2 |
| Hydrotalcite (b1) "Kyowaad 500SH" (specific surface area: 102 $m^2/g$) | (parts) | 1.6 | | | | |
| Hydrotalcite (b2) "DHT-4C" (specific surface area: 15 $m^2/g$) | (parts) | | | | | |

TABLE 1-continued

| | | | | | | |
|---|---|---|---|---|---|---|
| Hydrotalcite (b3) "DHT-4A-2" (specific surface area: 13 m²/g) | (parts) | | 2.4 | | | |
| Hydrotalcite (b4) "Magceler" (specific surface area: 9 m²/g) | (parts) | | | | 2.4 | |
| Hydrotalcite (b5) "Alcamizer" (specific surface area: 8 m²/g) | (parts) | | | | | 2.4 |
| Magnesium oxide | (parts) | 0.3 | | 2.4 | | |
| Calcium carbonate | (parts) | | | 4 | | |
| Content ration of onium ion unit | (mol %) | 0.58 | 1.22 | 1.22 | 1.26 | 1.25 |
| Mooney viscosity ML1 + 4 (100° C.) | | 58 | 68 | 52 | 5 | 4 |
| Roll processability | | A | B | C | D | D |
| Compression set | (%) | 18 | 10 | 12 | — | — |
| Volume resistivity value (Ω · cm) | | | | | | |
| Measurement condition 1: 23° C. 50% RH | (Ω · cm) | 6.7 | 6.8 | 6.6 | — | — |
| Measurement condition 2: 32° C. 80% RH | (Ω · cm) | 6.0 | 6.1 | 5.7 | — | — |
| Measurement condition 3: 10° C. 20% RH | (Ω · cm) | 7.4 | 7.6 | 7.5 | — | — |
| Measurement condition 3 – Measurement condition 2 | (Ω · cm) | 1.4 | 1.6 | 1.9 | — | — |
| Increased value in volume resistivity value caused by electric current | | 0.72 | 0.57 | 0.96 | — | — |

As shown in Table 1, when a polyether rubber containing epihalohydrin monomer unit in 0.1 mol % or more and a nitrogen atom-containing aromatic heterocyclic compound were subjected to an onium-forming reaction in the presence of a hydrotalcite having a specific surface area of 10 m²/g or more as an acid acceptor, the obtained cationized polyether rubber had excellent roll processability (Examples 1 to 11). Moreover, in Examples 1 to 11, it was confirmed that, concerning the cross-linked rubbers obtained using this cationized polyether rubber, the difference between the volume resistivity values when the temperature and the humidity were changed (the difference between the volume resistivity value measured under measurement condition 3 and the volume resistivity value measured under measurement condition 2) was smaller, and the increased value in the volume resistivity value caused by electric current was more reduced, than those of the cross-linked rubber of Comparative Example 1. Also, compared with Examples 8 to 11 wherein the amount of 1-methylimidazole to be used was reduced and the content ratio of the onium ion unit was lowered, the cross-linked rubbers of Examples 1 to 7 had a lower compression set and thus had superior compression set resistance.

On the other hand, the cationized polyether rubber obtained by subjecting the polyether rubber and the nitrogen atom-containing aromatic heterocyclic compound to an onium-forming reaction without adding the hydrotalcite as an acid acceptor had poor roll processability (Comparative Example 1). Also, in Comparative Example 1, concerning the cross-linked rubber obtained using this cationized polyether rubber, the difference between the volume resistivity values when the temperature and the humidity were changed was large, and the increased value in the volume resistivity value caused by electric current was also large.

Also, even when the hydrotalcite as an acid acceptor was added, the obtained cationized polyether rubbers had poor roll processability if the specific surface area of the hydrotalcite used was too small (Comparative Examples 2 and 3).

The invention claimed is:

1. A method of production of a polyether rubber containing unit expressed by the following general formula (1) in 0.1 mol % or more and less than 30 mol % comprising:
reacting a polyether rubber containing epihalohydrin monomer unit in 0.1 mol % or more and a nitrogen atom-containing aromatic heterocyclic compound by kneading in the presence of an acid acceptor containing at least a hydrotalcite having a nitrogen adsorption specific surface area as measured by a BET method of 14 m²/g or more so as to substitute at least part of halogen atom constituting the epihalohydrin monomer unit with a group containing a cationic nitrogen-containing aromatic heterocyclic ring:

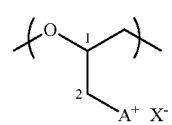

(1)

wherein, in the above general formula (1), $A^+$ is a group containing a cationic nitrogen-containing aromatic heterocyclic ring, where the group containing a cationic nitrogen-containing aromatic heterocyclic ring is bonded with a carbon atom at the "2" position shown in the above general formula (1) through a nitrogen atom constituting the cationic nitrogen-containing aromatic heterocyclic ring, and $X^-$ is any counter anion.

2. The method of production of a polyether rubber according to claim 1, wherein an amount of the hydrotalcite to be used is 0.1 to 15 parts by weight with respect to 100 parts by weight of the polyether rubber containing epihalohydrin monomer unit in 0.1 mol % or more.

3. The method of production of a polyether rubber according to claim 1, wherein the hydrotalcite contains at least Mg and Al.

4. The method of production of a polyether rubber according to claim 1, wherein the nitrogen atom-containing aromatic heterocyclic compound is a five-membered heterocyclic compound or a six-membered heterocyclic compound.

5. The method of production of a polyether rubber according to claim 1, wherein, further, an oxide, hydroxide, and/or carbonate of at least one of magnesium, calcium, and barium are used as the acid acceptor in a proportion of 0.1 to 5 parts by weight with respect to 100 parts by weight of the polyether rubber containing epihalohydrin monomer unit in 0.1 mol % or more.

6. The method of production of a polyether rubber according to claim 1, wherein, further, magnesium oxide is used as the acid acceptor in a proportion of 0.1 to 2 parts by weight with respect to 100 parts by weight of the polyether rubber containing epihalohydrin monomer unit in 0.1 mol % or more.

\* \* \* \* \*